(12) United States Patent
Kemppinen

(10) Patent No.: US 7,567,237 B2
(45) Date of Patent: Jul. 28, 2009

(54) OPENING AND CLOSING OF A USER INTERFACE ELEMENT

(75) Inventor: Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 643 days.

(21) Appl. No.: 11/152,826

(22) Filed: Jun. 14, 2005

(65) Prior Publication Data

US 2006/0017700 A1    Jan. 26, 2006

(30) Foreign Application Priority Data

Jun. 18, 2004    (FI)    ............................... 20040853 U

(51) Int. Cl.
*G09G 5/00* (2006.01)
(52) U.S. Cl. .................. 345/168; 345/169; 361/679.08
(58) Field of Classification Search ......... 345/156–169; 455/575.3–575.4, 90; 361/683, 679.08, 679.15, 361/679.35; 400/82, 489, 691–693
See application file for complete search history.

(56) References Cited

U.S. PATENT DOCUMENTS 5,267,127 A * 11/1993 Pollitt ........................ 361/680

| | | | |
|---|---|---|---|
| 6,539,208 B1 | 3/2003 | Mori | ........................... 455/90 |
| 2004/0052044 A1* | 3/2004 | Mochizuki et al. | .......... 361/683 |
| 2005/0002158 A1* | 1/2005 | Olodort et al. | .............. 361/683 |
| 2005/0020097 A1* | 1/2005 | Kawahigashi et al. | ......... 439/38 |

FOREIGN PATENT DOCUMENTS

| | | |
|---|---|---|
| EP | 19632770 | 2/1998 |
| EP | 0888005 A2 | 12/1998 |
| EP | 2370657 A | 3/2002 |
| JP | 11353283 A | 12/1999 |
| JP | 2003069674 | 3/2003 |
| JP | 2003216305 | 7/2003 |
| JP | 2004080147 | 3/2004 |
| WO | WO 0142891 | 6/2001 |

* cited by examiner

*Primary Examiner*—Amare Mengistu
*Assistant Examiner*—Hong Zhou
(74) *Attorney, Agent, or Firm*—Perman & Green, LLP

(57) ABSTRACT

The invention relates to an electronic device that comprises a body part, a sliding cover attached to it by a slide mechanism, and a user interface element, such as a keyboard or a display. The user interface element is attached to both the body part and the sliding cover by hinges, and it comprises a hinge for folding up the user interface element within the device when the sliding mechanism is closed.

22 Claims, 6 Drawing Sheets

OPENING AND CLOSING OF A USER INTERFACE ELEMENT

CROSS-REFERENCE TO RELATED APPLICATIONS

This application claims priority from Finnish Patent Application No. 20040853, filed on Jun. 18, 2004.

FIELD OF THE INVENTION

The invention relates to a user interface element and an electronic device, such as a mobile station, with a user interface element.

BACKGROUND OF THE INVENTION

The development of technology enables the manufacturing of smaller and smaller wireless communication devices. When the size of the device becomes smaller, this restricts the size of the display and keyboard with which the device is provided. In this case the size of the device compared to the desired size of the display and keyboard becomes a problem.

From the point of view of a user, a larger display is more informative and it is easier to use a larger keyboard (or larger keys) In other words, users want small devices whose size, however, makes them nice enough to use.

Conventionally some mobile telephone models, such as Nokia 7650, adopt a keyboard slide solution, where the keyboard is covered by a sliding cover. The sliding cover is slid away and the keyboard is uncovered, when the user wants to use the keyboard. In this case the problem is that the keyboard and the sliding cover take up a fair amount of space even when they are not used.

In other mobile telephone models, such as Nokia 6820, instead of a sliding cover covering the keyboard, a keyboard is arranged on the underside of a cover covering a body part. The cover is hinged to the body part, which also provides a keyboard. When the cover is opened, a display and the keyboard in the body part located on the right side of the display are uncovered. The hinged cover is turned past the display upside down to the left side of the display, in which case the keyboard on the underside of the cover is located on the left side of the display. Thus in this mobile telephone the keyboard is located on both-sides of the display, which allows using the keys conveniently by both hands. However, the solution makes the mobile telephone rather thick.

WO 01/42891 A1 discloses a solution, where a display and a keyboard manufactured of a flexible material have been rolled within the mobile telephone. When a user wants to use the keyboard and display, the mobile telephone is expanded by rolling out the display and keyboard from the roll. However, the solution presented is rather sensitive in terms of the support of the display and keyboard.

SUMMARY OF THE INVENTION

The invention presents a novel solution that enables placing a user interface element (such as a keyboard) that is relatively large in its usage position in a small device.

According to a first aspect of the invention there is provided an electronic device that comprises a body part, a sliding part slidingly connected to it, and a user interface element. It is characteristic of the electronic device that when the sliding part and the body part are moved in relation to each other the user interface element is arranged to unfold or fold up according to the direction of the movement.

The user interface element may be a folding keyboard, for example, or a folding display or a combination element of these. It may comprise game controllers and/or loudspeakers. In an embodiment of the invention a keyboard solution is presented that is based on a slide technique, but when the slide is closed, the keyboard is folded within the device instead of sliding it under or within the device.

In an embodiment of the invention, the electronic device is small in a closed position, but at the same time a large display is in use. In an opened position a keyboard that opens up from within the device is also uncovered for use.

Said electronic device may be a mobile station or a comparable hand-held device.

In an embodiment of the invention the electronic device comprises two folding user interface elements that are located at the ends of the device. When the user interface elements are keyboards, in an embodiment of the invention the direction of a display of the device can be adjusted on the basis of which keyboard or keyboards are in an open position.

According to a second aspect of the invention there is provided a user interface element for an electronic device, which user interface element comprises an attachment mechanism for attaching the user interface element to a sliding part of the electronic device, which sliding part is slidingly attachable to a body part of the device. It is characteristic of the user interface element that when the sliding part and the body part are moved in relation to each other, the user interface element is arranged to unfold or fold up according to the direction of the movement.

In an embodiment of the invention the user interface element comprises a folding mechanism in order to fold up the user interface element when the sliding part and the body part are moved in relation to each other.

In an embodiment of the invention said attachment mechanism is an element allowing jointed movement, such as a joint. In an embodiment of the invention also said folding mechanism of the user interface element is implemented by a joint. Here a joint means a hinge, for example, or a bearing or a comparable mechanism that enables jointed movement. In another embodiment of the invention slide mechanisms can be used instead of joints, such as slide bars or similar.

According to a third aspect of the invention there is provided a method for controlling a user interface of an electronic device, which electronic device comprises a body part, a sliding part slidingly connected to it and a user interface element. It is characteristic of the method that when the sliding part and body part are moved in relation to each other, the user interface element unfolds or folds up according to the direction of the movement, wherein the method comprises: detecting the position of the user interface element, and controlling the user interface of the device on the basis of the detected position of the user interface element.

According to yet another aspect of the invention there is provided an electronic device that comprises a body part and a sliding part attached to it by a slide mechanism and a user interface element that is configured to fold up when closing the slide mechanism.

The dependent claims concern embodiments of the invention. The contents of dependent claims related to one aspect of the invention can be applied to other aspects of the invention, too.

BRIEF DESCRIPTION OF THE DRAWINGS

In the following the invention is described in detail by means of examples by reference to attached drawings, in which.

DETAILED DESCRIPTION

In the following part of the description a folding keyboard has been used as an example of a user interface element of an electronic device. However, it is clear that alternatively the user interface element may be some other suitable user interface element, such as a folding display, one or more game controllers and/or a loudspeaker on a folding base or any combination of the above.

Figure 1:
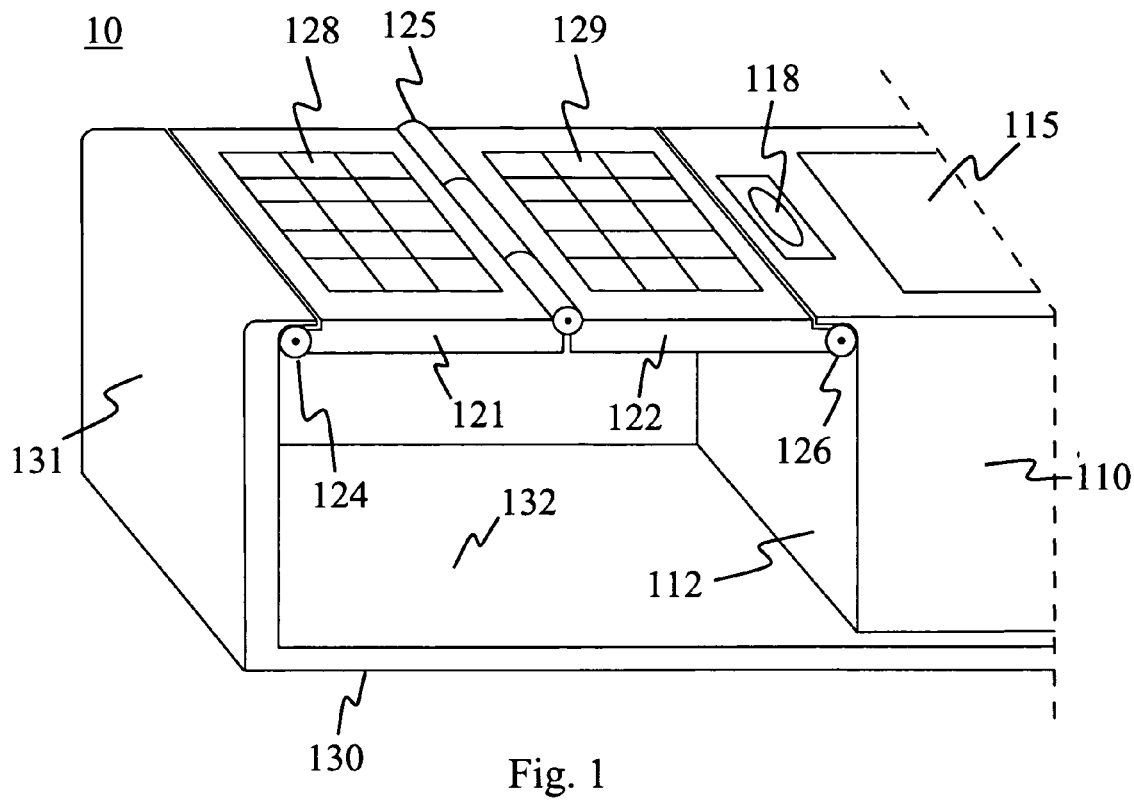
FIG. 1 shows a keyboard of an electronic device in an opened position according to an embodiment of the invention.

FIG. 1 shows a keyboard of an electronic device according to an embodiment of the invention in an opened position (or in a position where the keyboard can be used). The electronic device 10, where the keyboard is located, comprises a body part 110 and a sliding part, such as a sliding cover 130. The body part comprises a display 115. It may also comprise a roll 118 and keys 117 by means of which the device 10 can be used, in addition to the keyboard. The sliding cover 130 can be moved in relation to the body part 110. For example, it may be equipped with a conventional slide mechanism (a slide bar or a comparable mechanism) that enables the movement of the sliding cover 130 along the body part 110.

The keyboard shown in FIG. 1 comprises two keyboard parts 121 and 122 that fold in relation to each other and that are attached to each other by a hinge 125. Keys 128 are located in the first keyboard part and keys 129 are located in the second keyboard part. The first keyboard part is attached by a hinge 124 to the sliding cover 130, whereas the second keyboard part is attached by a hinge 126 to the body part 110. The hinges enable revolving movement of the keyboard parts 121, 122 in relation to the body part 110, the sliding cover 130 and each other.

Together with an end wall 112 of the body part, a bottom surface 132 of the sliding cover, an end wall 131 of the sliding cover, and side walls of the sliding cover (not shown in FIG. 1), the keyboard parts 121 and 122 delimit an empty space that is located under the keyboard.

Figure 2:
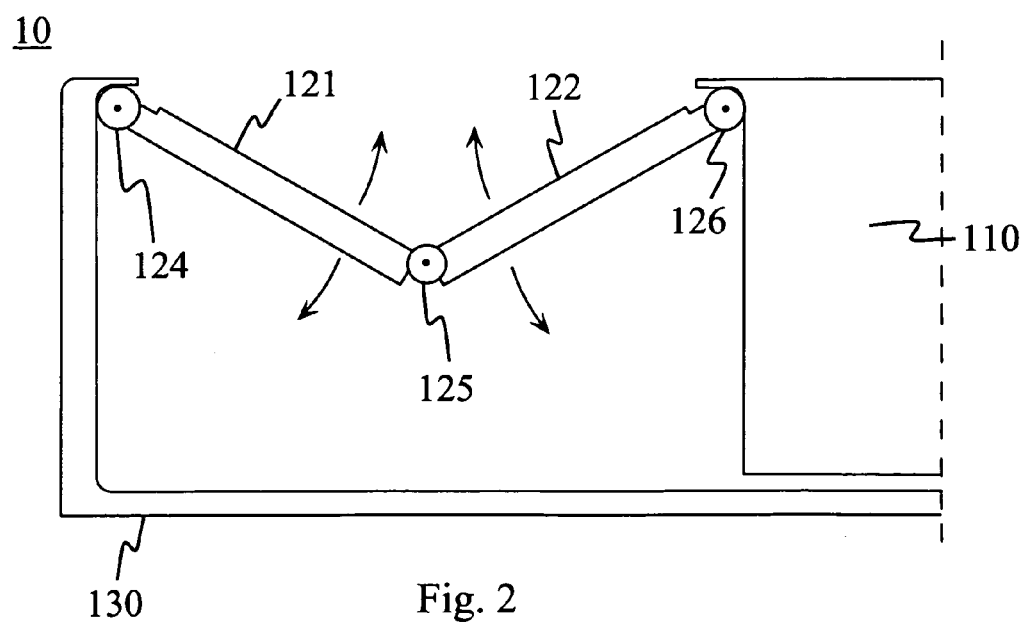
FIG. 2 shows a keyboard of an electronic device in a semi-open position according to an embodiment of the invention.

FIG. 2 shows the keyboard of the electronic device 10 in a semi-open position. In this position the keyboard parts 121 and 122 are folded in relation to each other by means of the hinge 125. The hinge 124 allows the first keyboard part to fold in relation to the sliding cover 130 and the hinge 126 allows the second keyboard part 122 to fold in relation to the body part 110.

When the sliding cover 130 is slid away from the body part 110, the keyboard parts rises upwards (unfolds) towards the open position shown in FIG. 1. When the sliding cover 130 is slid towards the body part 110, the keyboard parts fold more in relation to each other (fold up) towards a closed position shown in FIG. 3.

Figure 3:
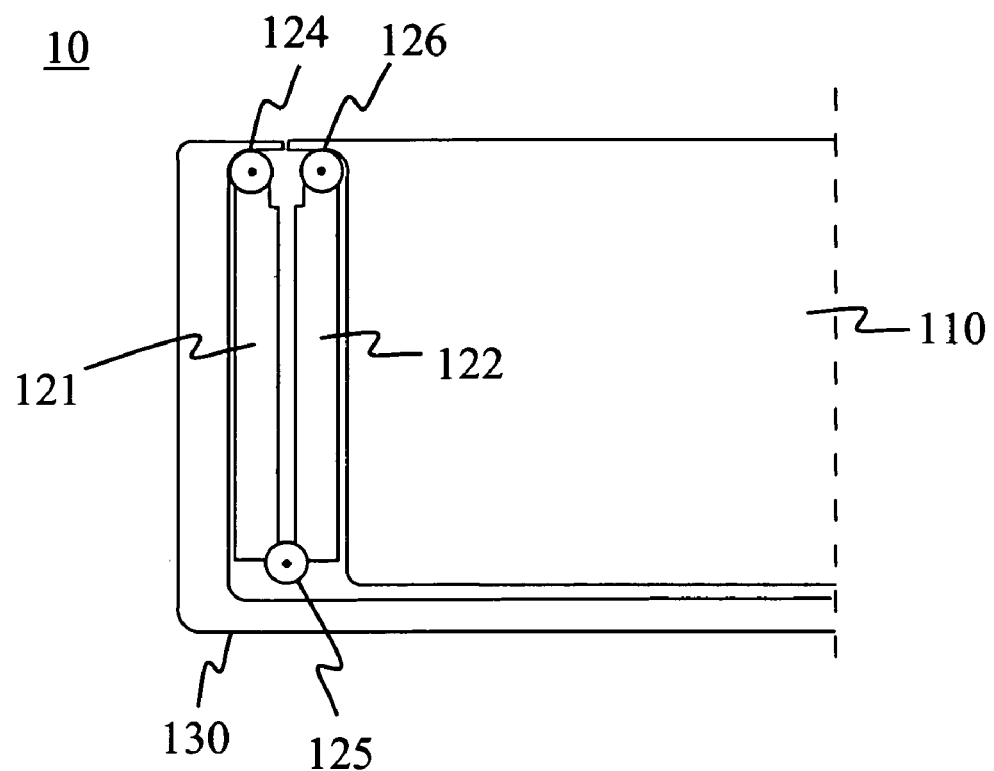
FIG. 3 shows a keyboard of an electronic device in a closed position according to an embodiment of the invention.

FIG. 3 shows the keyboard of the electronic device 10 in a closed position. In this position the keyboard parts 121, 122 are fully folded against each other. They are located in the space delimited by the end wall 112 (FIG. 1) of the body part, the bottom surface 132 of the sliding cover, the end wall 131 of the sliding cover and the side walls of the sliding cover. In the closed position the folded keyboard takes up space at the end of the device only. On the top surface of the device only a small gap or no gap at all remains between the sliding cover 130 and the body part 110, in which case carrying of dust into the space where the keyboard is located in the closed position can be reduced.

When the keyboard is in the closed position, the large display 115 of the body part of the device is visible, however, and it can be used by the roll 118, for example, or other keys suited to the purpose, which can be the keys 117 (FIG. 1) located beside the display 115. If the device is a mobile station, the keys 117 can, for example, have the following functions: answering a call and ending the call.

When the keyboard is in the opened position (FIG. 1), it would be good to support the middle hinge 125 in order for the keyboard not to bend down when a key is pressed. For this purpose suitable locking grooves can be located in the side wall(s) of the device (in the side wall(s) of the sliding cover 130 or alternatively, depending on the implementation, in the side wall(s) of the body part) to which a pin of the middle hinge 125 is fitted.

Figure 4:
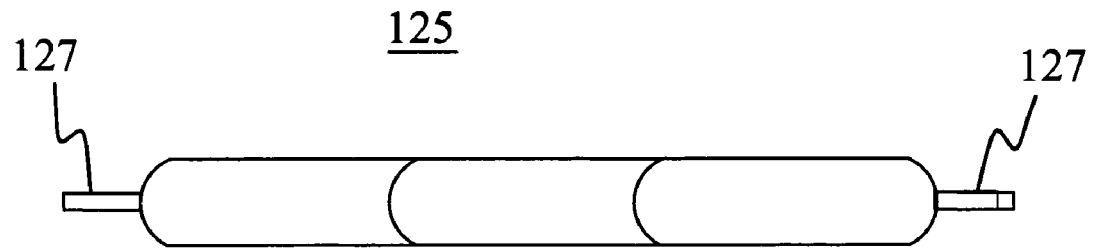
FIG. 4 shows a hinge in an embodiment of the invention.

FIG. 4 shows a hinge 125 according to an embodiment of the invention. The hinge is arranged to include hinge pins 127 parallel to the axle of the hinge.

Figure 5:
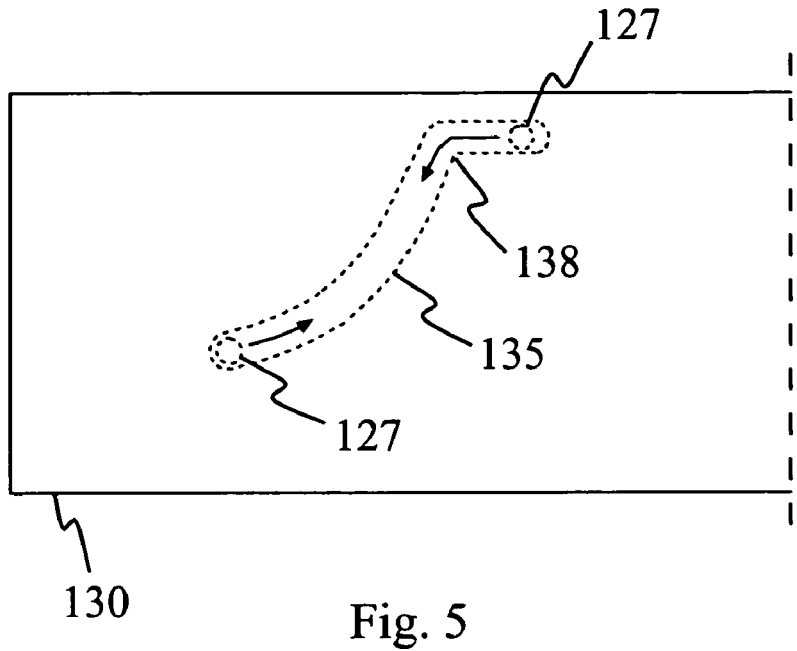
FIG. 5 illustrates a side wall according to an embodiment of the invention.

FIG. 5 illustrates a side wall of a device (a side wall of a sliding cover 130 or that of a body part 110) according to an embodiment of the invention. In FIG. 5 the viewing direction is substantially the same as in FIGS. 1-3. The side wall 133 shown in FIG. 5 therefore is the side wall of the device 10 shown in FIG. 1, which would remain on the side of the viewer, if it would have been drawn in FIG. 1. The side wall 133 has a locking groove 135, which has been drawn by a dashed line because it remains on the side of the device in FIG. 5, or on that side of the side wall 133 that remains away from the viewer viewed from the level of the figure (or the paper). A hinge pin 127 is fitted to the groove 135. The form of the groove is determined by the combination of the sliding of the sliding cover and the rotating movement caused on the hinge by the folding keyboard parts 121 and 122. The arrows shown in the figure represent the movement of the hinge pin 127 in the groove 135.

When the keyboard is in a closed position, the hinge pin 127 is at the other end of the groove 135 (the lower left corner of the groove 135 in FIG. 5). When the keyboard is opened, the hinge pin 127 moves upwards in the groove. At the end of the groove 135 there is a small bend and a platform that secures the locking of the keyboard upwards in the opened position. In this case the hinge pin 127 has moved to the other end of the groove 135 (the upper right corner).

The keyboard parts 121, 122 can be very thin. By current techniques it is possible to produce keyboard parts that are some 3 mm thick. Such a thickness already includes the potential back lights of the keys.

The keys are electrically connected to the other parts of the device. Thin flex cables, for example, can be fitted within the device, in which case the signals of the keys can be transferred to the other parts of the device through them. A suitable number of copper wires can be arranged in the cables. The keyboard may in itself comprise a keyboard driver, from which data can be delivered in serial format to a central processing unit (CPU) of the device.

Figure 6:
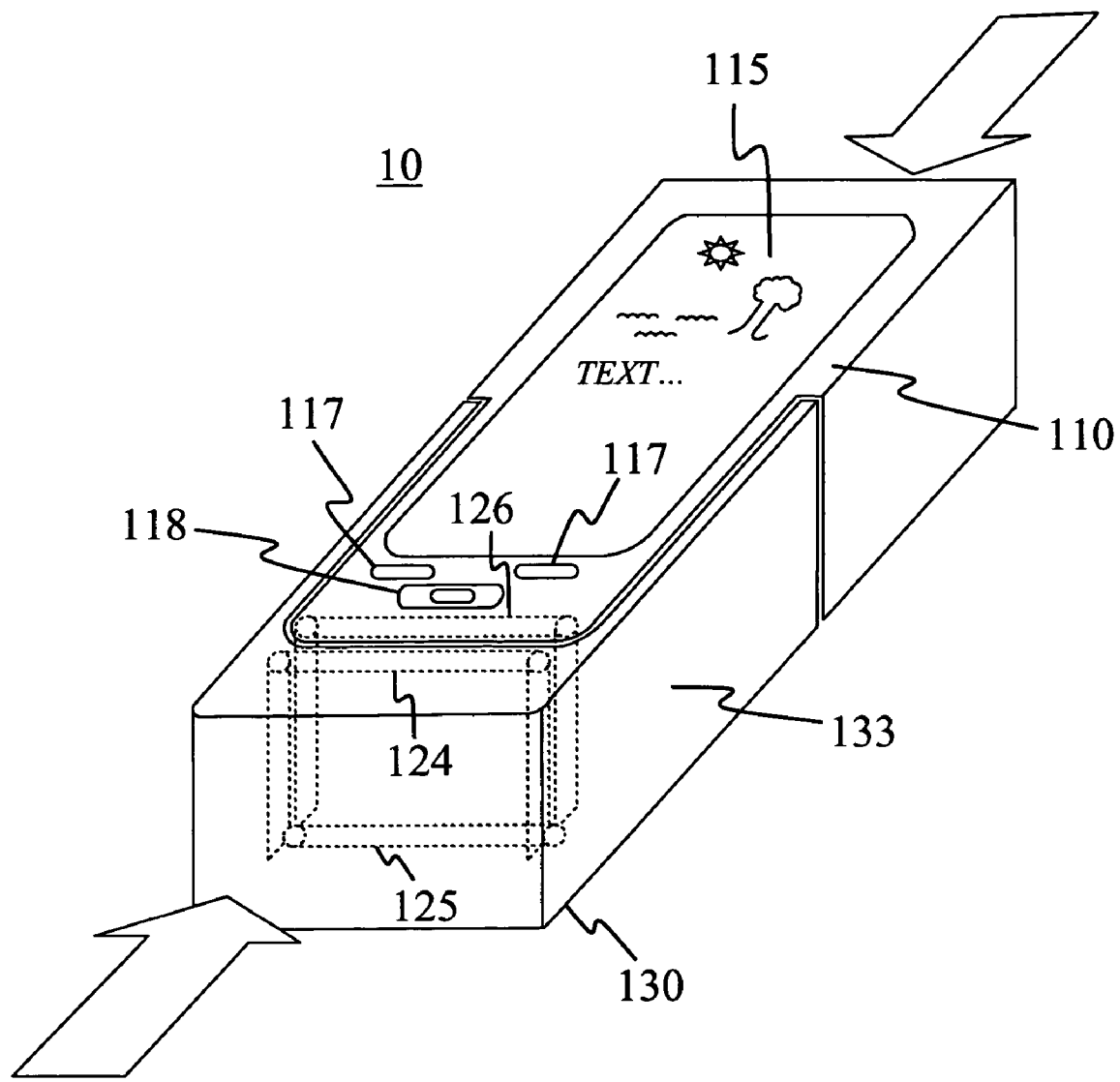
FIG. 6 illustrates the opening of an electronic device according to an embodiment of the invention.

FIG. 6 illustrates the opening of the device 10 according to an embodiment of the invention. The device in FIG. 6 is of the so-called push-push type. When a keyboard is in a closed position and the device is pressed from the ends, the locking of the device 10 is opened and a sliding cover 130 can be drawn open. When the sliding cover is drawn open, keyboard parts 121 and 122 unfold forming the keyboard according to FIG. 1.

When a user wants to close the device 10, it is again pressed from the ends. First the middle hinge 125 (FIG. 1) is released. When the device is pressed further, the keyboard formed of the parts 121 and 122 is folded up within the device 10 at its rear part in the position according to FIG. 3 and the device is locked.

Alternatively, if the sliding cover 130 is locked in the body part by a spring mechanism (not shown), when the device 10 is pressed from the ends the keyboard being in the closed position, the spring is released and it opens the device 10 in the position shown in FIG. 1. When the user wants to close the device 10, it is pressed closed from the ends.

Figure 7:
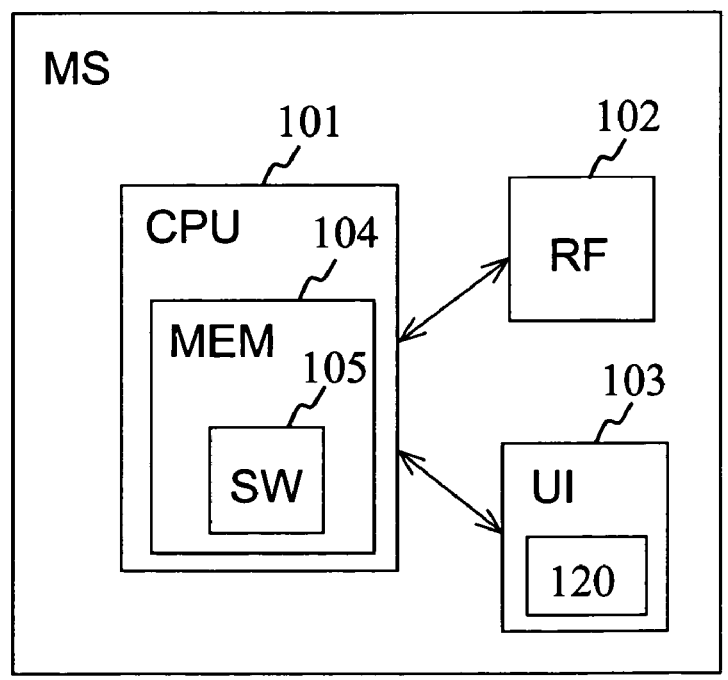
FIG. 7 shows an electronic device according to an embodiment of the invention.

As an example of an electronic device according to the embodiments presented, FIG. 7 shows a mobile station 10 of a cellular network in a simplified block diagram. The mobile station 10 of FIG. 7 comprises a processing unit 101, a radio frequency part 102 and a user interface 103. The radio frequency part 102 and the user interface 103 are coupled to the processing unit 101. The user interface 103 typically comprises a display (not shown), a keyboard 120 and a loudspeaker (not shown) by means of which the user can use the device.

The processing unit 101 comprises a processor (not shown) and a memory 104. The main software 105 of the device is stored in the memory 104. By means of the software the processor controls the operation of the device 10, such as use of the radio frequency part 102, display of information on the display of the user interface 103 and reading of inputs received via the keyboard 120. Here the keyboard 120 can be thought to comprise the keyboard parts 128 and 129. As has been stated above, the keyboard in itself can comprise a driver from which the signals from the keyboard can be delivered to the processing unit in serial format, for example, through a flexible cable.

Figure 8:
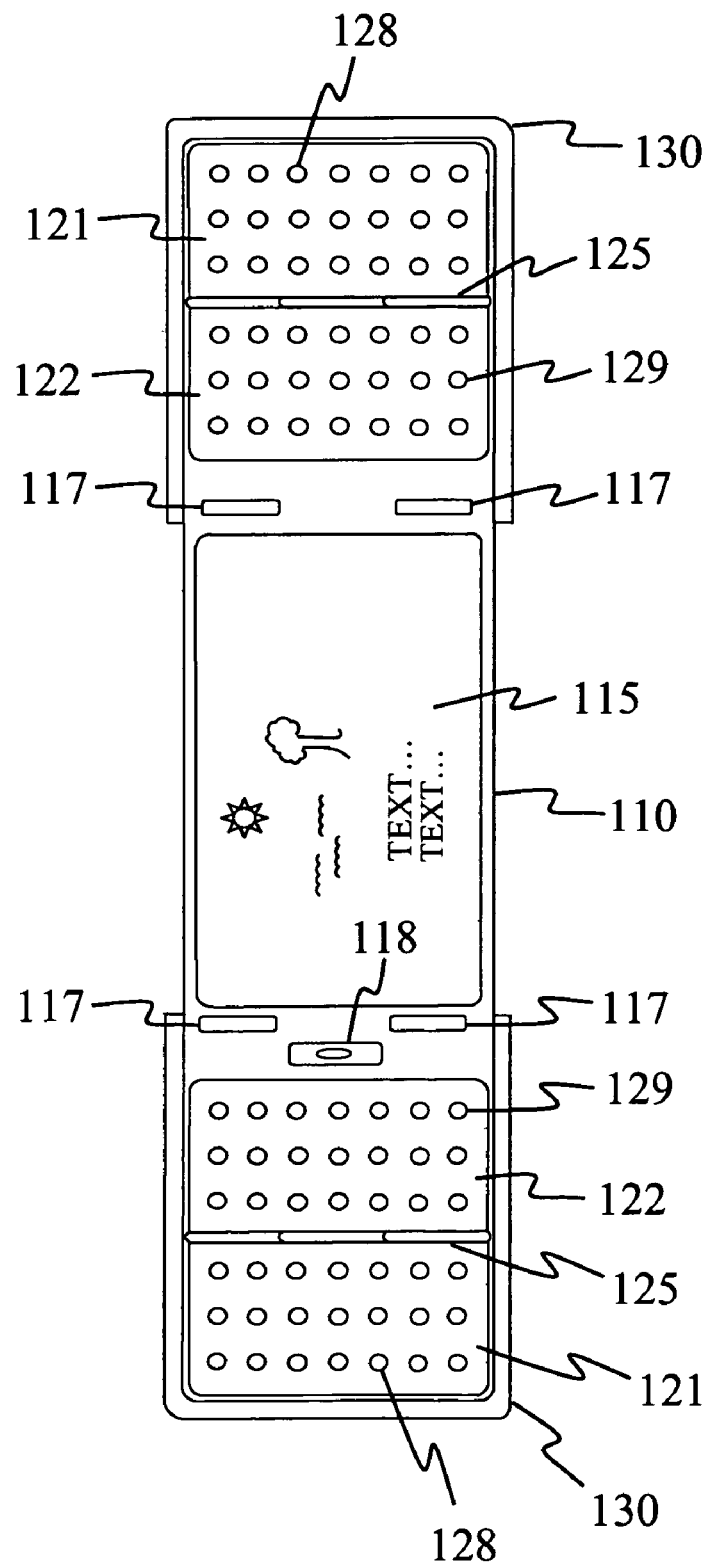
FIG. 8 illustrates an electronic device according to another embodiment of the invention.

FIG. 8 illustrates an electronic device 10 according to another embodiment of the invention. The same reference numbers have been used for those elements that correspond to the corresponding elements in the previous figures.

In the embodiment shown in FIG. 8, the folding keyboard 121, 122 shown in the previous embodiments of the invention is located at both ends of the device. FIG. 8 shows the device 10 in a position where the keyboards at both ends are in an opened position.

It is known from mobile telephones comprising sliding covers that the position of the keyboard (open or closed) can be detected by a detector (not shown in FIG. 8), which has been arranged in connection with a body part, a sliding part or a slide bar. In this case, according to which of the keyboards is opened, a display 115 can be configured in the right position.

In the case of FIG. 8, for example, the device can be operated so that each user interface element (here: a keyboard) is activated upon opening a sliding part 130 (and upon closing is deactivated, respectively), when the sliding part passes a certain threshold (this is detected by the detector mentioned above). The position of a display 115 is controlled depending on which of the keyboards is/are activated. In the case shown in FIG. 8 the keyboards at both ends of the device 10 have been activated (they are open), in which case they are located conveniently ready for use at both sides of the display. The display can be configured by cooperation of the processing unit 101 and the user interface block 103 in the position shown in FIG. 8, for example (horizontal display). Correspondingly, if only one of the keyboards is open, the display can be configured to the position shown in FIG. 6 (vertical display).

Figure 9:
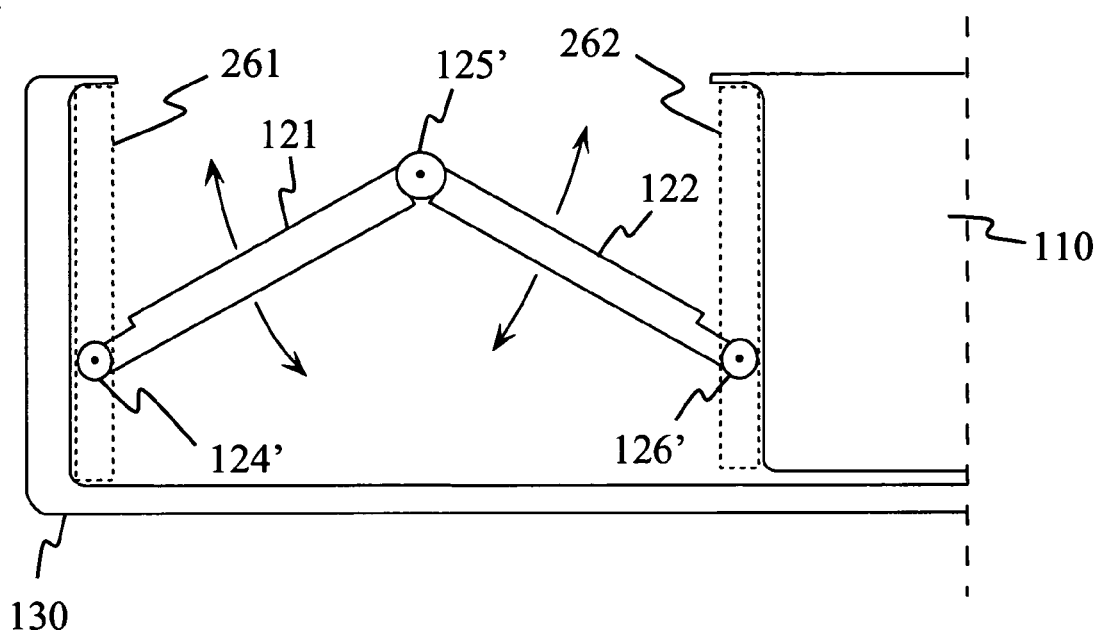
FIG. 9 shows yet another embodiment of the invention.

FIG. 9 shows yet another embodiment of the invention. Differently from FIG. 2, where the user interface element (here: a keyboard) is arranged to fold in the form of the letter V in the semi-open position, in this embodiment it folds upside down in the form of an inverted V.

In the semi-open position in FIG. 9 keyboard parts 121 and 122 are folded in relation to each other by means of a hinge 125'. An electronic device 20 comprises a first slide mechanism 261 embedded in the device and a second slide mechanism 262 wherein hinges 124' and 126' are embedded and where they move when a sliding part 130 is moved in relation to a body part 110. In practice the hinges 124' and 126' can be implemented, depending on the implementation, by nothing but pins or wheels that slide/roll in grooves or on bars of the slide mechanisms 261, 262.

When the sliding part 130 is slid away from the body part 110, the keyboard parts rise upwards (unfold) towards the opened position shown in FIG. 1. When the sliding part 130 is slid towards the body part 110, the keyboard parts fold more in relation to each other (fold up), however, in such a way that, differently from FIG. 3, the hinge 125' remains in an upper position In yet another embodiment of the invention (not shown in the figures) it is also possible that a folding user interface element is attached to a sliding part 130 only, either by a jointed attachment or a slide attachment.

The embodiments of the invention enable keeping the size of an electronic device, such as a mobile station, small but still introducing a relatively large keyboard to the device without the size of the device becoming very much larger in a closed position. In the embodiments of the invention an opening and closing mechanism is presented where a slide mechanism is combined with the folding of a user interface element. When the user interface element is a folding keyboard, it comprises a large number of usable keys in an opened position. As the keyboard folds within the device in a relatively small space when the slide is closed, the solution presented takes up less space in comparison to many current solutions. Thus the embodiments of the invention enable implementing a larger user interface element, such as a keyboard, in devices of the same size as are enabled by certain known solutions.

In this description, implementation and its embodiments of the invention have been described by means of examples. It is clear to one skilled in the art that the invention is not restricted to the details of the embodiments presented above and that the invention can be implemented in other form without deviating from the characteristics of the invention. For example, in the embodiment presented in FIG. 1, the middle hinge 125 of the device 10 can alternatively be formed differently in such a way that it cannot be seen from the outside of the device when a user interface element (here: a keyboard) is in an opened position. Naturally, the user interface element can be formed of more than two folding parts of the user interface element that are attached to each other by a jointed attachment (such as hinges). There can be three parts, for example, that are connected by two hinges, for example. Or then there can be even more parts of the user interface element and there are one less of the connecting parts than there are parts of the user interface element.

The embodiments presented should be considered illustrative but not restricting. The possibilities of implementation and use of the invention are only restricted by the claims attached. Thus the various implementation possibilities defined by the claims, including equivalent implementations, fall within the scope of the invention.

The invention claimed is:

1. An apparatus comprising:
   a body part,
   a sliding part slidingly connected to said body part,
   and a user interface element separate from the sliding part, the user interface element comprising first and second folding user interface parts, the first folding user interface part revolvingly connected to the sliding part and the second folding user interface part revolvingly connected to the body part, wherein when the sliding part and the body part are moved in relation to each other, said first and second folding user interface parts are arranged to unfold apart from each other or fold up against each other according to the direction of the movement, and wherein
   the sliding part is formed of a sliding cover that covers the user interface element either altogether or at least partly when the first and second folding user interface parts are in a folded position against each other, and wherein
   when folding against each other the first and second folding user interface parts are configured to fold up into a space delimited by the sliding cover and the body part so that when in the folded position against each other they take up space at an end of the apparatus only.

2. An apparatus according to claim 1, wherein when the sliding part is moved towards the body part, the user interface element is arranged to fold up.

3. An apparatus according to claim 1, wherein when the sliding part is moved away from the body part, the user interface element is arranged to unfold.

4. An apparatus according to claim 1, wherein the user interface element is attached both to the sliding part and the body part and that the user interface element comprises a folding mechanism in order to fold up the user interface element when the sliding part and the body part are slid in relation to each other.

5. An apparatus according to claim 4, wherein said folding mechanism is a mechanism allowing jointed movement, such as a joint, a hinge, a bearing or a comparable mechanism.

6. An apparatus according to claim 4, wherein said folding mechanism is located in the middle area of the user interface element.

7. An apparatus according to claim 1, wherein the user interface element is attached to the sliding part and/or the body part by one or more mechanisms allowing jointed movement, such as a joint, a hinge, a bearing or a comparable mechanism.

8. An apparatus according to claim 1, comprising at least one slide mechanism or a comparable mechanism by means of which the user interface element is attachable to the sliding part and/or the body part of the device.

9. An apparatus according to claim 1, wherein the user interface element is arranged to fold in the form of a V or an inverted V in its semi-open position.

10. An apparatus according to claim 1, comprising more than one folding user interface element.

11. An apparatus according to claim 1, wherein the user interface element comprises at least two keyboard parts that comprise keys and that are configured to fold on top of each other by means of the folding mechanism.

12. An apparatus according to claim 1, wherein the sliding part is configured to slide along the body part.

13. An apparatus according to claim 1, wherein the device comprises a side wall having a groove in order to guide the folding of the user interface element.

14. An apparatus according to claim 13, wherein the folding mechanism comprises a protruding element such as a hinge pin that is fitted to said groove of the side wall.

15. An apparatus according to claim 1, wherein the user interface element is selected from a group that comprises: a folding display, a folding keyboard, a game controller on a folding base, a loudspeaker on a folding base, and a combination of any of the above.

16. An apparatus according to claim 1, wherein said electronic device is a mobile station.

17. A method comprising:
    controlling a user interface of an apparatus, which apparatus comprises a body part, a sliding part slidingly connected to said body part, and a user interface element separate from the sliding part, the user interface element comprising first and second folding user interface parts, the first folding user interface part revolvingly connected to the sliding part and the second folding user interface part revolvingly connected to the body part, the method comprising controlling the user interface by:
    moving the sliding part and the body part in relation to each other to unfold the first and second folding user interface parts apart from each other or to fold the first and second user interface parts up against each other according to the direction of the movement,
    covering the user interface element either altogether or at least partly when the first and second folding user interface parts are in a folded position against each other using the sliding part as a sliding cover,
    folding the first and second folding user interface parts up into a space delimited by the sliding cover and the body part so that when in the folded position against each other the first and second folding user interface parts take up space at an end of the apparatus only,
    detecting a position of the user interface element, and
    controlling the user interface of the apparatus according to the detected position of the user interface element.

18. A method according to claim 17, wherein the position of the user interface element is detected by a detector that is arranged in connection with the sliding part.

19. A method according to claim 17, wherein the user interface element is activated upon opening the sliding part when the sliding part passes a certain threshold.

20. A method according to claim 17, wherein the user interface element is deactivated upon closing the sliding part when the sliding part passes a certain threshold.

21. A method according to claim 17, wherein the apparatus comprises a display and the method comprises controlling the position of the display according to which of the user interface elements is/are activated.

22. A method according to claim 17, wherein the user interface element is selected from a group comprising: a folding display, a folding keyboard, a game controller on a folding base, a loudspeaker on a folding base, and any combination of the above.

* * * * *